Patented July 23, 1940

2,209,035

UNITED STATES PATENT OFFICE 2,209,035

REFRACTORY INVESTMENT

Emil M. Prosen, Philadelphia, Pa., assignor to Nobilium Products, Inc., Philadelphia, Pa., a corporation of Pennsylvania No Drawing. Application November 26, 1938, Serial No. 242,559

5 Claims. (Cl. 22—188)

This invention relates to refractories and more particularly to refractory investment materials for use in mechanical dentistry in the making of refractory investments, molds, models and the like.

In mechanical dentistry plaster of Paris mixtures have heretofore been used extensively in the preparation of molds for casting dental fittings and appliances and have been on the whole satisfactory in casting with the precious metals whose fusion point is not so high in the temperature range as to exert deleterious effects on the mold or investment.

With the advent of relatively high melting point stainless alloys for making dental fittings the plaster investment materials have been found unsuitable for use as molds because of insufficient refractory qualities to accommodate the high casting temperatures necessary and they also have insufficient mechanical strength to withstand high pressures and the considerable thermal expansion encountered in casting with some modern stainless alloys.

It has been proposed to employ certain silica refractories mixed with suitable binders for making investments to be used with these high melting point alloys and such refractories have met with some success in certain instances. They generally present, however, certain disadvantages such as lack of control of expansion and in many instances the casting does not come out of the mold readily or with a smooth surface.

It is an object of the present invention to provide a silica refractory investment material which can be sold in a dry powdered form and which, when mixed with a temporary binder such as water or weak acids, may be used to form molds, investments, models and the like, which are quick to set, which have a very high degree of refractoriness and a large amount of mechanical strength and are therefore particularly suitable for casting with relatively high melting point alloys.

Another object is to provide a silica investment material wherein the silica appears in carefully graded sizes which will insure a close control of expansion, density and smoothness of surface of molds and investments produced from the material.

A further object is to provide an investment material which will set firmly and rapidly in a moist environment.

Still another object is to provide an investment material which will have different and desirable characteristics when made into investments or models through the use of different substances as temporary binders.

Generally speaking, in the preferred embodiment of the invention the investment material is composed mainly of silica or silica sand with relatively small amounts of magnesium oxide or periclase, mono-basic ammonium phosphate, and mono-basic sodium phosphate. One of the main features of the invention is realized through having the silica present in three carefully graded and controlled sizes which, for the purposes of description, may be designated as coarse, intermediate and fine. The following formula represents a mixture which has been found to be eminently satisfactory for the purposes hereinbefore mentioned and those presently to be described:

| | Parts |
|---|---|
| Silica | 94 |
| Magnesium oxide | 6 |
| Mono-basic ammonium phosphate | 3 |
| Mono-basic sodium phosphate | 1 |

As previously indicated, the silica is present in three different, carefully graded sizes. In the preferred form the amount of silica in the foregoing formula may consist of 44 parts which has a size of minus 10 plus 12 mesh, 20 parts minus 80 plus 100 mesh and 30 parts which may be conveniently described as flour, being composed mainly of minus 325 mesh particles. The periclase and the other ingredients should preferably be finely divided and likewise composed of minus 325 mesh sizes.

The division of the silica into the three different sizes as just illustrated has the faculty of promoting expansion of the molds and models in setting. In making models from this material the dried models, due to the graded silica component, will be slightly larger than the molds from which they were made. Thus in casting dentures the sides and faces of the investment will compensate for shrinkage of the cast metal as it goes from liquid to solid. This mold expansion is not so apparent in investment materials heretofore known and the molds previously used have not been able to take care of this shrinkage of the cast metal as sufficiently as is to be desired.

Furthermore, the amount of shrinkage can be controlled by adjustment of the relative amounts of coarse, medium and fine sizes forming the silica component. In other words, different metals and alloys produce different amounts of shrinkage upon going from the molten to the solid state. Therefore, it is contemplated that the investment material of the present invention will be supplied with the coarse, medium and fine silica portions arranged in other ratios than that set forth in the above formula and a suitable investment material may be obtained which is particularly suitable for casting different metals and alloys. In other words, control of the graded sizes of the silica can assure that expansion of the refractory model can equal, or approximately equal the shrinkage of the metal or alloy to be cast.

The investment material of this invention will set quickly and satisfactorily in a moist environment, will not stick to the duplicating material and will not warp or distort in setting. Most refractory investments set from within and constantly draw moisture from their surroundings. The material of the present invention sets from the outside first and the surface exposed to moisture hardens faster as the internal gases escape. Due to the presence of some coarse material the gases evolved by chemical reaction escape easily and completely through channels provided by the relatively coarse particles.

In making up models, molds and investments from the material of this invention, the powered mixture as previously described may be mixed with water as a temporary binder and packed into the flask or into a rubber mold for the purpose of making a refractory model or for whatever other purposes are desired in the practice of mechanical dentistry. For many purposes the water bond will be quite satisfactory and it has the desirable feature that the material sets very rapidly and can be used in a shorter time than has heretofore generally been possible.

However, in certain instances it is desirable to use a weak acid for mixing the material up into a paste prior to making the shape desired. When a 10% hydrochloric acid solution is used, it tends to slow the ultimate setting of the material to some extent but a model or investment is produced which has a hardness approximately three times greater than that attained through the use of water. Furthermore, mixing the material with nitric acid of a strength of about 10% slows the setting somewhat and produces a shape which is not quite as strong as that attained through use of hydrochloric acid but is highly beneficial in certain instances in that a metal casting is more easily removable and comes away cleaner than when other temporary binders are used.

The characteristics just noted enable a practice to be followed in working with the present investment material that will result in simpler operations and the production of a clean and accurate casting with a minimum of time and effort.

In one method of casting dentures and dental fittings, an impression of the mouth is taken in wax or plaster and from this a permanent mold may be formed. A refractory investment is made from the mold, is then covered appropriately with wax and inserted into a flask filled with refractory material and the wax volatilized or driven off by heat through the sprews that are provided through the refractory filling of the flask. Thereafter the molten metal may be forced through the sprews and into the space vacated by the volatilized wax to form the ultimate metallic fitting.

In working with the investment material of the present invention, the investment made from the mold may be conveniently formed from the present investment material using hydrochloric acid of a strength of about 10% as a temporary binder. This will produce, as previously indicated, an investment which is highly refractory and very dense and hard. The refractory filling for the flask may be formed of the material of the present invention using nitric acid of a strength of about 10% as a temporary binder. As previously indicated this will produce a mold, which does not have to be quite as hard as the investment model, but which has quite adequate refractory and mechanical strength and from which the hardened metal casting may be removed with ease and in a clean and smooth condition. There is thus provided a convenient method of utilizing features of the present invention through making a very hard and accurate model with hydrochloric acid as a temporary binder, and of ultimately investing the model in a mold which is filled with the refractory material of the present invention mixed with nitric acid so that the casting may be removed easily and cleanly.

I claim:

1. A plastic refractory investment material comprising silica about 94 parts, magnesium oxide about 6 parts, mono-basic ammonium phosphate about 3 parts and mono-basic sodium phosphate about 1 part, with a dilute acid as a temporary binder.

2. A plastic refractory investment material comprising silica about 94 parts, magnesium oxide about 6 parts, mono-basic ammonium phosphate about 3 parts and mono-basic sodium phosphate about 1 part, with an acid chosen from the group comprising hydrochloric acid and nitric acid as a temporary binder.

3. An investment material for use in casting an alloyed metal containing small amounts of finely-divided periclase as well as mono-basic ammonium phosphate and mono-basic sodium phosphate in the ratio of substantially three to one, a wetting agent of a dilute acid as temporary binder, and balance quartz proportioned in quantity and graded sizes whereby the investment thus has its co-efficient of shrinkage controlled to equal substantially that of the metal being cast in the investment as the metal passes downwardly from the critical point at which the metal becomes rigid.

4. An investment according to claim 3, wherein the periclase used is of the order of 6%, and the total of the two mono-basic phosphates is of the order of 4%, and the quartz is present in three graded sizes.

5. An investment according to claim 3, wherein the acid used is selected from a group comprising hydrochloric and nitric acids and the acid is diluted to 10% in strength.

EMIL M. PROSEN.